United States Patent [19]

McWhirter

[11] Patent Number: 4,727,503

[45] Date of Patent: Feb. 23, 1988

[54] SYSTOLIC ARRAY

[75] Inventor: John G. McWhirter, Malvern Wells, England

[73] Assignee: The Secretary of State for Defence in Her Britannic Majesty's Government of United Kingdom, London, England

[21] Appl. No.: 627,626

[22] Filed: Jul. 3, 1984

[30] Foreign Application Priority Data

Jul. 6, 1983 [GB] United Kingdom ................. 8318333

Jul. 6, 1983 [GB] United Kingdom ................. 8318269

[51] Int. Cl.[4] ................................................ G06F 7/38

[52] U.S. Cl. .................................... 364/715; 364/200; 364/754

[58] Field of Search ... 364/715, 754, 736, 200 MS File, 364/900 MS File, 757-760

[56] References Cited

U.S. PATENT DOCUMENTS

| | | | |
|---|---|---|---|
| 3,106,698 | 10/1963 | Unger | 364/200 |
| 4,432,066 | 2/1984 | Benschop | 364/758 |
| 4,493,048 | 1/1985 | Kung et al. | 364/754 |
| 4,533,993 | 8/1985 | McCanny et al. | 364/200 |
| 4,544,229 | 10/1985 | Verber | 364/822 |
| 4,544,230 | 10/1985 | Caulfield | 364/822 |
| 4,588,255 | 5/1986 | Tur et al. | 364/715 |

OTHER PUBLICATIONS

Algorithms for VLSI Processor Arrays, H. T. Kung and Charles Leiserson, pp. 271-293.

Least Squares Computations by Given Transformations Without Square Roots, W. Morven Gentleman (1973), pp. 329-336.

Matrix Triangularization by Systolic Arrays, W. M. Gentleman, H. T. Kung (1981), pp. 19-26.

*Primary Examiner*—Gary V. Harkcom

*Assistant Examiner*—Dale M. Shaw

*Attorney, Agent, or Firm*—Cushman, Darby & Cushman

[57] ABSTRACT

A systolic array of cells for processing a data stream includes an arrangement of nearest-neighbor connected boundary cells, internal cells and a multiplier, arranged as a triangular array and a column. The boundary cells are diagonally interconnected. Each boundary cell evaluates sine and cosine rotation parameters from data received from above for lateral transfer to a neighboring internal cell, and multiplies a diagonal input by the cosine parameter for diagonal output. Each internal cell receives rotation parameters from the left, applies them to data from above to produce an output below, and passes them on laterally. Data input to the column becomes cumulatively rotated before output from the final downstream internal cell. The final downstream boundary cell provides cumulatively multiplied cosine parameters. The multiplier provides the product of the outputs of these final cells. The product is the least squares residual arising from weighted minimization of input signals.

14 Claims, 5 Drawing Figures

BOUNDARY CELL

IF $x_{IN} = 0$, THEN $c = 1;\ s = 0$

ELSE :-

$r' = (r^2 + x_{IN}^2)^{\frac{1}{2}}$ $c = r/r'$ $s = x_{IN}/r'$ $r\ (\text{UPDATED}) = r'$

INTERNAL CELL $x_{OUT} = -sr + c\ x_{IN}$ $r = c.r + s.x_{IN}$

BOUNDARY CELL

IF $x_{IN} = 0$, THEN $\begin{cases} \bar{c} = 0 \\ \bar{s} = 0 \end{cases}$

FOR BOUNDARY CELL $11_{11}$, $\delta_{IN} = 1$ (INITIAL CONDITION)

$d' = d + \delta_{IN} x_{IN}^2$ $\bar{c} = d/d'$ $\bar{s} = \delta_{IN} x_{IN} / d'$ $z = x_{IN}$ $\delta_{OUT} = c\, \delta_{IN}$ d (UPDATED) = d'

INTERNAL CELL $X_{OUT} = X_{IN} - zr$ r (UPDATED) $= r\,\bar{c}r + \bar{s}x_{IN}$

SYSTOLIC ARRAY

BACKGROUND OF THE INVENTION

This invention relates to a systolic array, and more particularly to a systolic array for solving least squares problems.

Systolic arrays are known, the concept being set out by Kung and Leiserson in "Systolic Arrays (for VLSI)" in the text of "Introduction to VLSI Systems" by Mead and Conway", Addison-Wesley (1980). Such an array comprises individual electronic signal processing cells which are interconnected. The operation of the array as a whole depends on the function of individual cells and the interconnection scheme, the only external control required being a clock. The term "systolic" arises from the clock "pumping" the operation of the array. The basic advantage of systolic arrays is that complex operations may be performed by arrays of comparatively simple processing cells having defined functions and appropriate interconnections, preferably nearest-neighbour interconnections only. This approach is highly applicable to the construction of very large scale integrated (VLSI) circuits.

Systolic arrays are particularly suitable for performing pipelined operations. A sequence of operations is said to be pipelined if an element of a data stream can enter the sequence before the preceding element has left it. Pipelining is highly beneficial in VLSI, since it affords the possibility of reducing the number of idle devices awaiting data.

The nomenclature employed in the art of systolic array technology for matrix computations express mathematical relationships rather then physical ones. Arrays implemented as electronic circuits are geometrically arranged on the basis of engineering convenience, since the important factors are processing cell functions and cell interconnections, not the physical positions of electronic components. Accordingly, for the purposes of this specification, geometrical and positional expressions such as triangular, column, nearest neighbour, diagonal, hypotenuse, boundary, internal etc describing array features shall be construed as terms of art expressing mathematical relationships and extending to or including corresponding features of topologically equivalent arrays.

In "Matrix Triangularization by Systolic Arrays", Proc. SPIE., Vol 28, Real-Time Signal Processing IV (1981), Kung and Gentleman showed that systolic arrays might be employed to solve linear least squares problems which arise in a wide range of signal and data processing applications. The particular problem is to determine a p-vector of statistical weights $\underline{w}(N)$ for which $||X\underline{w}(N)-\underline{y}||$ is minimized, where $\underline{y}$ is a given N-vector of data elements and X is a given Nxp design matrix with p≦N, the usual Euclidean norm being assumed.

Kung and Gentleman solve this problem by a two stage process employing two coupled systolic arrays. The first systolic array is triangular, and is used to implement a pipelined sequence of Givens rotations. The mathematics of Givens rotations is described by Gentleman, J. Inst. Maths. Applics (1973), 12, pp 329-336. The approach is to carry out a QR decomposition of the matrix X; ie the sequence of Givens rotations operates on the elements of X to build up a unitary matrix Q such that:

$$QX = \begin{bmatrix} R \\ 0 \end{bmatrix} \quad (1)$$

where R is a pxp upper triangular matrix (a matrix in which all subdiagonal elements are zero). Each element of R is computed by and stored in a corresponding processing cell of the systolic array as elements x of the matrix X are clocked into it. The approach is to (Givens) rotate each successive row of X with each row of R in turn. The major diagonal of the triangular systolic array is occupied by boundary cells having processing functions appropriate to evaluate sine and cosine Givens rotation parameters. All other (ie above-diagonal) cells are referred to as internal cells, and have processing functions appropriate to apply the rotation parameters to incoming data comprising elements of X. The array may be schematically illustrated as a right isosceles triangle with one shorter side horizontally uppermost and the other vertical. Cell interconnections are between nearest horizontal and vertical neighbours only.

Information or rows of X enters the triangular array via its uppermost row in a temporally skewed order as required to synchronize array operation. This will be described in more detail later. Each boundary or internal cell stores a respective current value r or element of the upper triangular matrix R. Each boundary cell receives input data from above, updates the respective stored value of r, evaluates the rotation parameters and transfers them to the respective lateral nearest neighbour internal cell. Each internal cell receives rotation parameters from one side and input data from above. It applies the rotation parameters to the input, passes on the parameters laterally, provides an output below and updates its stored value of r. When all the elements x of the nxp matrix X have flowed through the triangular systolic array in a pipelined manner, the values of r stored in the cells give the elements of the upper triangular matrix R. An exact QR decomposition or triangularisation of the matrix X has been performed. It should be emphasised that the stored cell values only represent the R matrix when all data has flowed completely through the array. During processing, the stored cell values correspond to data input at different times, in view of the temporal skew applied to input data and the fact that horizontally or vertically successive cells are at any time processing progressively earlier data.

The n-vector of data elements $\underline{y}$ is fed into a further column of internal cells alongside the triangular array and connected to it in a nearest neighbour fashion. The rotation parameters from the array are passed to this further column for application to $\underline{y}$ after operation on X. In effect, the vector $\underline{y}$ is processed as an extra column of the matrix X.

The evaluation of Givens rotation parameters by the boundary cells normally requires calculation of square roots. However, Kung and Gentleman also describe an array for square root free parameter evaluation based on the earlier work of Gentleman, J. Inst. Maths Applics, Vol 2, pp 329-336, 1973. In effect, the Givens rotation is mapped into a different mathematical domain for the purposes of avoiding square root calculation. Different boundary and internal processing cell functions are required, and the boundary cells are connected together along the array diagonal. The values stored by the cells are not equal to the elements of the matrix R, but have a simple relationship thereto. The square root free approach is accordingly mathematically equivalent to the previous technique. It is also possible to employ other forms of processing cells having different but equivalent functions.

The second stage of the Kung and Gentleman procedure to obtain the weight vector $\underline{w}(N)$ comprises extracting the values stored by each cell of the triangular array and feeding them into a linear systolic array. The linear array performs a back-substitution process which solves the triangular linear system associated with Equation (1) and given by:

$$R\underline{w}(N)=Q_1\underline{y} \quad (2)$$

where $Q_1$ is a matrix comprising the first p rows of the matrix Q previously defined. Accordingly, $Q_1\underline{y}$ denotes the first p elements of the vector obtained by applying the same series of Givens rotations to the vector $\underline{y}$ as were employed to generate R from X.

The linear systolic array generates the required weight vector $\underline{w}(N)$ directly, providing an exact least squares solution. The vector $\underline{w}(N)$ is then available inter alia for calculating the least squares residual $e_N$ defined by:

$$e_N=\underline{x}_N^T\underline{w}(N)-y_N \quad (3)$$

where $y_N$ is the Nth element of $\underline{y}$, and $\underline{x}_N^T$ is the Nth or final row of the matrix X. However, the back-substitution process of Kung and Gentleman has a number of disadvantages. The triangular linear system may be ill-conditioned; eg if the Nxp martix X does not have full rank (either $N<p$ or N includes less than p independent rows), the back-substitution process involves division by zero which is undefined. The back-substitution process may also be numerically unstable, ie involve division by small inaccurate quantities. This could be improved by interchanging columns of X, but such a procedure would be inconsistent with the design of a hard-wired systolic array representing a matrix having fixed rows and columns. Furthermore, Kung and Gentleman require both a triangular and a linear systolic array to solve the Equation (2) triangular linear system, and need to compute the vector product $\underline{x}_N^T\underline{w}(N)$ in order to obtain the least squares residual $e_N$.

SUMMARY OF THE INVENTION

It is an object of the present invention to provide a modified form of systolic array for solving least squares problems.

The present invention provides a systolic array for processing a data stream flowing through it, the array including nearest neighbour connected processing cells arranged as a triangular array of internal and boundary cells together with a column of internal cells, the boundary and internal cells having processing functions appropriate for evaluating and applying rotation parameters respectively, and processing means arranged to provide recursively the product of each cumulatively rotated data element with cumulatively multiplied cosine rotation parameters. It has been found, surprisingly, that the product of each cumulatively rotated data element with cumulatively multiplied cosine parameters is equal to the recursive least squares residual. The array of the invention therefore has the advantage that least squares residuals are derived recursively without the need to employ a linear systolic array to produce statistical weight vectors by back substitution. This avoids the problems of numerical instability and ill-conditioning and reduces the amount of electronic circuitry required. Moreover, the derivation of recursive residuals is advantageous over the once and for all solution provided by the prior art array.

In a preferred embodiment, the cumulative product of cosine parameters is derived by diagonally connecting the boundary cells, each of which has the additional function of multiplying its diagonal input by the respective evaluated cosine parameter (or its equivalent for non-Givens rotation algorithms) to provide a diagonal output. The output of the final downstream boundary cell is then either equal to the cumulative product of cosine rotation parameters or is related to it according to the rotation algorithm employed. Moreover, the output of the final downstream internal cell of the column is a function of each cumulatively rotated data element. The processing means computes the recursive least squares residual from these two outputs.

In the cases of processing cell functions appropriate for Givens rotation by the square root or square root free algorithm hereinbefore outlined, the processing means comprises a multiplier arranged to multiply together the respective diagonal and vertical outputs of the final downstream boundary and internal cells. The diagonally connected boundary cells have functions to generate cumulative multiplication of Givens rotation cosine parameters or their square root free equivalent. The vertical output of the final downstream internal cell provides data elements to which all evaluated rotation parameters have been applied, and the output product produced by the multiplier provides the required least squares residuals.

An exponential memory may be incorporated in the array of the invention to allow operation in a continuously adaptive mode.

Data for processing by the array may be made subject to linear constraints. For this purpose, the array may be associated with means for subtracting a linear constraint factor from data prior to array entry.

The array of the invention may be employed for linear predictive filtering of images comprising a two dimensional array of data elements or pixels. Each pixel is predicted from the product of associated pixels and a vector of weights which minimizes the prediction error over an ensemble of pixels. The difference between the prediction and the corresponding actual received pixel value may be registered if significant and discarded if not. This provides a means for reducing an image to its significant features only, with consequent reduction in data. The difference corresponds to the least squares residual produced by the invention.

The array of the invention may alternatively be employed for processing signals from a phased array radar having primary and auxiliary antennas and operating as an adaptive digital beamformer. The invention is employed to provide residuals corresponding to differences between the primary antenna signal and a weighted linear combination of the auxiliary antenna signals. This makes it possible to substract noise or jamming signals from the primary antenna signal.

BRIEF DESCRIPTION OF THE DRAWINGS

In order that the invention might be more fully understood, one embodiment thereof will now be described, by way of example only, with reference to the accompanying drawings, in which.

DETAILED DESCRIPTION OF THE PRESENTLY PREFERRED EXEMPLARY EMBODIMENT

Figure 1:
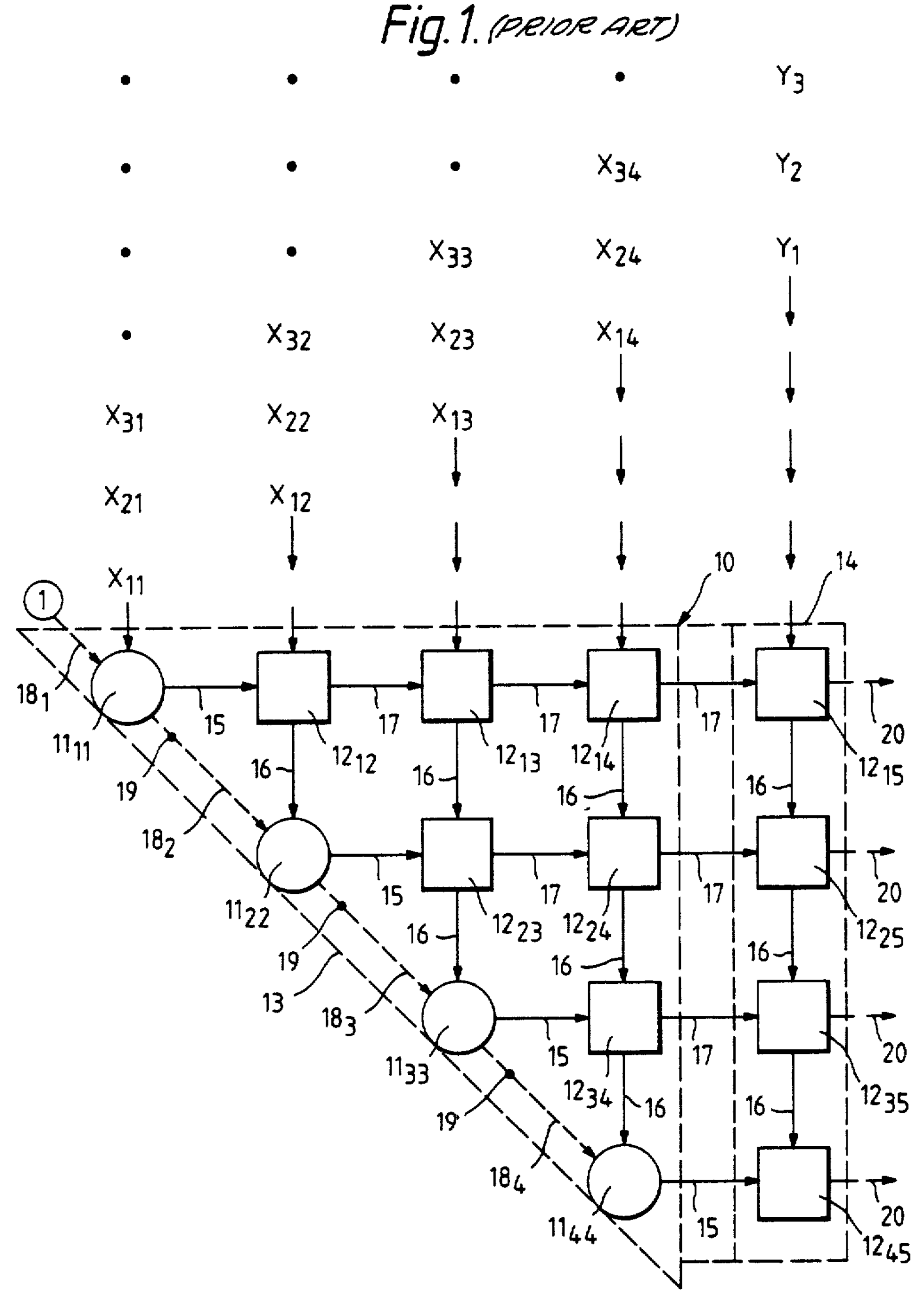
Fig. 1. (PRIOR ART)
FIG. 1 is a schematic drawing of a prior art generalized systolic array.

Referring to FIG. 1, a prior art systolic array of processing cells of the kind described by Kung and Gentleman (ibid) is indicated generally by 10. The array 10 comprises four boundary cells 11 indicated by circles $11_{11}$ to $11_{44}$ and ten internal cells 12 indicated by squares $12_{12}$ to $12_{45}$, the first and second suffixes representing row and column positions respectively. The cells 11 and 12 are arranged in the form of a triangular array 13 of boundary and internal cells 11 and $12_{12}$ to $12_{34}$ with an additional column 14 of internal cells $12_{15}$ to $12_{45}$.

Each boundary cell 11 receives input data from vertically above, and evaluates rotation parameters for horizontal output as input to the respective downstream nearest-neighbour internal cell 12 as indicated by arrows 15. Each internal cell 12 receives information from vertically above, applies the rotation parameters thereto, provides an output indicated by arrows 16 to its respective vertical downstream nearest-neighbour cell 11 or 12 below, and passes the rotation parameter horizontally to its respective lateral downstream nearest-neighbout cell (if any) 12 as indicated by arrows 17. Each boundary or internal cell 11 or 12 also stores a respective matrix element which is associated with the triangular matrix R, initially zero and subsequently updated on each cycle of array calculation. The cells 11 and 12 operate in synchronism in equal lengths of time per cycle under the control of a clock (not shown).

The boundary cells 11 may optionally receive an additional data input from diagonally above, perform a further operation upon it and provide a corresponding output to the respective nearest-neighbour boundary cell diagonally below. This optional additional operation is indicated by arrowed chain lines $18_1$ to $18_4$, and is associated with delay or memory cells indicated by black dots 19 to synchronize array operation. The diagonal input $18_1$ to boundary cell $11_{11}$ would be initialized to unity. Two array operation cycles are required for information to pass from one boundary cell 11 to another via an internal cell 12, whereas only one cycle would be required for direct diagonal transfer between neighbouring boundary cells. The memory cells 19 provide a one cycle delay appropriate to synchronize the two inputs received by boundary cells $11_{22}$ to $11_{44}$.

Data for processing by the array 10 is in the form of an Nxp design matrix X of elements $x_{ij}$ and a column vector $\underline{y}$ of elements $y_i$, where i=1 to N, j=1 to p and p=4. The columns of X are fed into the triangular array portion 13, and the column vector $\underline{y}$ is fed into the additional column 14. Input is carried out in a temporally skewed order to the first or uppermost row of cells $11_{11}$ and $12_{12}$ to $12_{15}$ of the array 10, element $x_{i1}$ to cell $11_{11}$, element $x_{i2}$ to cell $12_{12}$ and so on to element $y_i$ to cell $12_{15}$. The temporal skew consists of a linearly increasing delay applied across the elements $x_{i1}$ to $x_{i4}$ and $\underline{y}$; ie the inputs of $x_{i2}$ to $y_i$ are respectively delayed by one to four array processing cells as compared to $x_{i1}$. When boundary cell $11_{11}$ receives an input element say $x_{ml}$, it calculates corresponding rotation parameters which subsequently progress across the first or uppermost row of the array 10 in a stepwise fashion each array cycle. By virtue of the temporal skew, the parameters from cell $11_{11}$ reach each of the cells $12_{12}$ to $12_{15}$ in synchronism with the respective input column element $X_{mj}$ (j=2 to 4) or $y_m$. Data elements in columns $x_{i2}$ to $x_{i4}$ experience one, two or three rotation applications at internal cells $12_{12}$, $12_{13}$ and $12_{23}$, and $12_{14}$ to $12_{34}$ respectively, before providing inputs to boundary cells $11_{22}$ to $11_{44}$ for further parameter evaluation and lateral output in the lower array rows. The temporal skew ensures that data elements reach internal cells 12 in synchronism with the relevant rotation parameters to be applied, irrespective of array position.

As the matrix X and column vector y are fed into the array 10, the triangular array 13 receiving the data elements of X builds up and subsequently updates the values stored in cells $11_{11}$ to $11_{44}$ and $12_{12}$ to $12_{34}$. Initially the stored value in each cell is zero. When four rows of X have passed through the triangular array 13, each cell has stored a respective calculated value. Thereafter, successive rows of X update and statistically improve the stored values.

When all data has flowed through the prior art array 10, the stored cell values correspond to the R matrix (triangular array 13) and $Q_1\underline{y}$ (column 14) in Equation (2). In order to solve Equation (2) for the weight vector $\underline{w}$(N), Kung and Gentleman (ibid) require the stored values to be transferred to a linear systolic array (now shown) for back-substitution. This requires a separate mode of operation of the cells 11 and 12, in which stored values are output from the array 10 as indicated schematically by arrowed chain lines 20.

Figure 2:
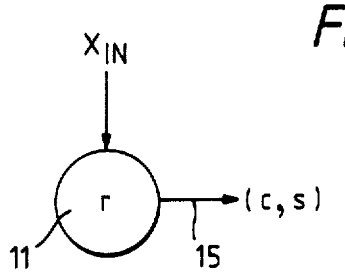
Fig.2. (PRIOR ART)
FIGS. 2 and 3 respectively provide cell function definitions for carrying out square root and square root free Givens rotations with the array of FIG. 1.
Figure 2:
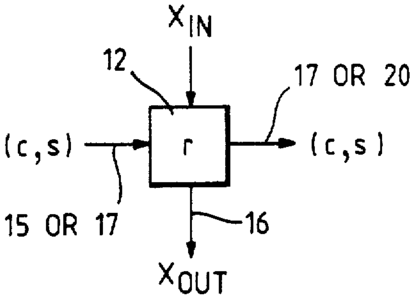
Fig.2. (PRIOR ART)

Referring now to FIG. 2, there are shown the boundary and internal cell functions for applying Givens rotations with square roots as described by Kung and Gentleman. Parts previously mentioned have like references. Each boundary cell 11 has a stored value of r (initially zero), receives an input $x_{in}$ from vertically above, computes the cosine and sine Givens rotation parameters c, s and updates r as follows:

$$r' = (r^2 + x_{in}^2)^{\frac{1}{2}} \quad (4.1)$$

$$c = r/r' \quad (4.2)$$

$$s = x_{in}/r'$$

$$(\text{If } x_{in} = 0 \text{ then } c = 1, s = 0)$$

$$r\,(\text{updated}) = r' \quad (4.3)$$

p The boundary cells 11 output the c, s parameters laterally to the right to the respective downstream nearest-neighbour internal cell 12.

The internal cells 12 each pass on the c, s parameters laterally to the respective nearest neighbour cell, receive inputs $x_{in}$ from vertically above, calculate outputs $x_{out}$ and update r as follows:

$$x_{out} = -sr + cx_{in} \quad (5.1)$$

$$r(\text{updated}) = sx_{in} + cr \quad (5.2)$$

No diagonal inputs to or outputs from the boundary cells 11 are required. The stored values of r provide the elements of the upper triangular matrix R required for QR decomposition.

Figure 3:
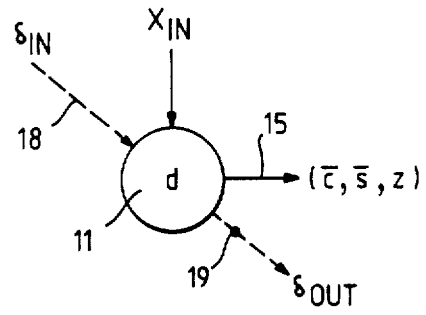
Fig. 3. (PRIOR ART)
Figure 3:
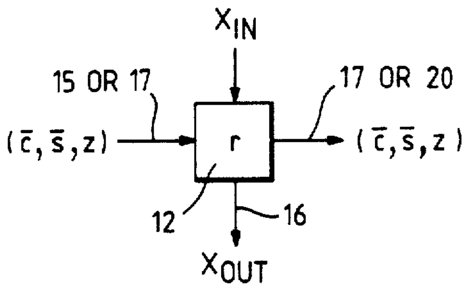
Fig. 3. (PRIOR ART)

Referring now to FIG. 3, there are shown cell functions for the square root free approach described by Gentleman (ibid). The boundary cells 11 each receive inputs $x_{in}$ from vertically above, $\delta_{in}$ from diagonally above, compute rotation parameters $\bar{c}$, $\bar{s}$ and z related (but unequal) to the Givens rotation parameters c, s, output $\bar{c}$, $\bar{s}$ and z laterally to the respective lateral nearest neighbour internal cell 12, and update a stored value d and calculate $\delta_{out}$. $\delta_{out}$ is transferred to the respective diagonal downstream nearest-neighbour boundary cell 11. The cell functions are as follows:

$$d' = d + \delta_{in}x_{in}^2 \quad (6.1)$$

$$\bar{c} = d/d' \quad (6.2)$$

$$\bar{s} = \delta_{in}x_{in}/d' \quad (6.3)$$

$$z = x_{in} \quad (6.4)$$

$$\delta_{out} = \bar{c}\delta_{in} \quad (6.5)$$

(If $\delta_{in} = 0$, or $x_{in} = 0$, then $\bar{c} = 1$ and $\bar{s} = 0$)

$$d\,(\text{updated}) = d' \quad (6.6)$$

$\delta_{in}$ is initialized to unity for input to the first boundary cell $\mathbf{11}_{11}$. The additional function of producing a diagonal output distinguishes the boundary cells 11 of FIG. 3 from those of FIG. 2.

The internal cells 12 each pass on the $\bar{c}$, $\bar{s}$ and z parameters laterally to the respective nearest-neighbour cell, receive inputs $x_{in}$, calculate outputs $x_{out}$ and update a respective stored value r as follows:

$$x_{out} = x_{in} - zr \quad (7.1)$$

$$r(\text{updated}) = \bar{c}r + \bar{s}x_{in} \quad (7.2)$$

Data flow through the array produces d values stored on boundary cells 11 and r values on internal cells 12. The stored values d provide the elements of a diagonal matrix D related to the upper triangular matrix R by:

$$R = D^{\frac{1}{2}}\bar{R}$$

where $\bar{R}$ is a triangular matrix having ones on the diagonal and other elements given by the stored values r.

Figure 4:
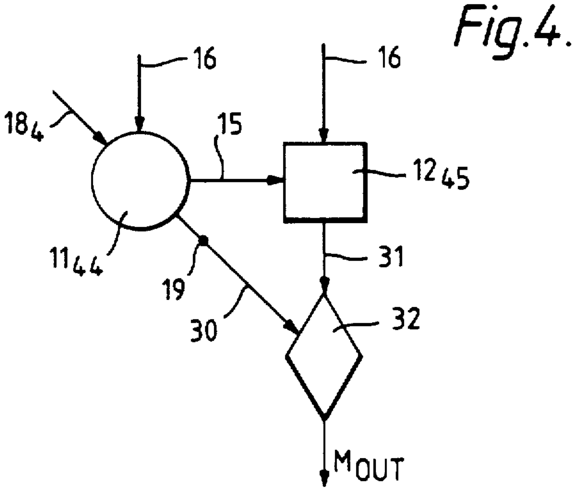
FIG. 4 is a schematic drawing of a modification of the FIG. 1 array in accordance with the invention.

Either of the sets of cell functions shown in FIGS. 2 and 3 may be employed in the array of FIG. 1 in conjunction with a linear systolic array to derive least squares solutions, the linear array receiving stored array values via the array outputs 20. These cell functions may be generalized to deal with complex data in appropriate cases. Referring now to FIG. 4, there is shown a modification to the array of FIG. 1 in accordance with the invention. A diagonal output 30 and a vertical output 31 are taken from the final downstream boundary and internal cells $\mathbf{11}_{44}$ and $\mathbf{12}_{45}$ in the triangular array 13 and the additional column 14 respectively. The outputs 30 and 31 are fed to processing means 32. In accordance with the invention, the array 10 also requires diagonal connections between the boundary cells 11 as indicated by arrows 18 in FIG. 1. Connections 20 from the array 10 to a linear array are however *not* required.

The cell functions may either be as indicated in FIG. 3, or as indicated in FIG. 2 with additional diagonal connections 18. Each boundary cell 11 additionally computes the product of its evaluated cosine (FIG. 2) or cosine-like (FIG. 3) rotation parameter and its respective diagonal input 18. The product is output to the respective diagonal nearest neighbour cell 11. An initial value of unity is input to cell $\mathbf{11}_{11}$ in either case. This produces cumulative multiplication of the cosine or cosine-like terms at the diagonal output 30 of the final boundary cell $\mathbf{11}_{44}$. The processing means 32 is a multiplier which multiplies together the outputs 30 and 31 of the final downstream boundary and internal cells $\mathbf{11}_{44}$ and $\mathbf{12}_{45}$ respectively. The output 31 of cell $\mathbf{12}_{45}$ provides elements of $\underline{y}$ which have undergone Givens rotation or the square root free equivalent by parameters evaluated at all four boundary cells $\mathbf{11}_{11}$ to $\mathbf{11}_{44}$. The output $M_{out}$ of the processing means 32 can be shown (see later proof) to be given by:

$$M_{out}(n+4) = \underline{x}_n^T \underline{w}(n) - y_n \quad (8)$$

Equation (8) represents the recursive least squares residual $e_n$ for the nth element of the vector $\underline{y}$ and the corresponding nth weighted row of the matrix X, $y_n$ having entered the systolic array 10 four processng cycles previously. The row vector $\underline{w}(n)$ of weights represents the least squares solution for all elements of X up to row $\underline{x}_n^T$. As further elements of $\underline{y}$ progress through the array, least squares residuals continue to be produced. These residuals are results required in many electronic signal processing applications, and are produced without solving explicitly for the weight vector $\underline{w}(n)$ as in the prior art. Problems with ill-conditioned or numerically unstable solutions are avoided, and the amount of circuitry needed is reduced since a linear systolic array is not required. There is no need to extract the stored values from the cells 11 and 12 to perform back-substitution. Furthermore, the least squares residuals are produced recursively, as opposed to the once and for all solution provided by the prior art.

In the general case of cell functions for evaluating and applying rotation parameters not necessarily of the Givens or square root free form, the processing means 32 is required to compute an output equal to the least squares residual $e_n$. In general the product of outputs of cells $\mathbf{11}_{44}$ and $\mathbf{12}_{45}$ will always have a simple relationship to the residual, which can be extracted by an appropriate processing means 32. Whereas diagonal boundary cell connections 18 provide a particularly elegant means for cumulatively multiplying cosine or cosine-like parameters, other means may be used in achieving the residual $e_n$. The basic requirement is that appropriate processing means 32 be employed to collect the cosine or cosine-like terms and corresponding cumulatively rotated data elements and to multiply them together.

The proof of Equation (8), that $M_{out}$ is in fact the recursive least squares residual, is as follows:

Given an nxp matrix X(n) with $n \geqq p$ and an n-element vector $\underline{y}(n)$, the corresponding n-element least squares residual vector e(n) is defined according to:

$$\underline{e}(n) = X(n)\underline{w} + \underline{y}(n) \quad (11)$$

where $\underline{w}(n)$ is the p-element vector of weights which minimizes $$E(n) = \|B(n)\underline{e}(n)\| \quad (12)$$

and $\|.\|$ denotes the usual Euclidean norm.

Assuming the notation:

$$X(n) = \begin{bmatrix} \underline{x}_1^T \\ \underline{x}_2^T \\ \cdot \\ \cdot \\ \underline{x}_n^T \end{bmatrix}, \ \underline{y}(n) = \begin{bmatrix} y_1 \\ y_2 \\ \cdot \\ \cdot \\ y_n \end{bmatrix} \text{ and } \underline{e}(n) = \begin{bmatrix} e_1 \\ e_2 \\ \cdot \\ \cdot \\ e_n \end{bmatrix}, \tag{13}$$

the iterative least squares problem may then be stated as follows: For successive values of n=p, p+1 . . . evaluate the least squares residual $$e_n = x_n^T w(n) + y_n \tag{14}$$

The diagonal matrix B(n) given by:

$$B(n) = \begin{bmatrix} \beta^{n-1} & & & 0 \\ & \beta^{n-2} & & \\ & & \cdot & \\ & & & \cdot \\ 0 & & & 1 \end{bmatrix} \tag{15}$$

is included for increased generality. It applies an exponential weight factor $\beta^{n-k}$ $(0<\beta\leqq 1)$ to each row $\underline{x}_k^T$ of the matrix X(n) and this has the effect of progressively weighting against the preceding rows of X(n) in favor of the nth row whose weight factor is unity. The more conventional unweighted least squares pattern (per Kung and Gentleman, ibid.) is obtained by setting $\beta=1$, in which case B(n) becomes a simple unit matrix.

For any value of n($\geqq$p), this least squares problem may be solved by the method of orthogonal triangularization. This method is numerically well-conditioned and may be described as follows: Generate an nxn unitary matrix Q(n) such that $$Q(n)B(n)X(n) = \begin{bmatrix} R(n) \\ \hline 0 \end{bmatrix} \tag{16}$$

where R(n) is a pxp upper triangular matrix. Since Q(n) is unitary, it follows that $$E(n) = \| Q(n)B(n)\underline{e}(n) \| = \left\| \begin{bmatrix} R(n) \\ \hline 0 \end{bmatrix} \underline{w} + \begin{bmatrix} \underline{U}(n) \\ \hline \underline{V}(n) \end{bmatrix} \right\| \tag{17}$$

where $$\begin{bmatrix} \underline{U}(n) \\ \hline \underline{V}(n) \end{bmatrix} = Q(n)B(n)\underline{y}(n) \tag{18}$$

i.e. where $$\underline{U}(n) = P(n)B(n)\underline{y}(n) \tag{19}$$

and $$\underline{V}(n) = S(n)B(n)\underline{y}(n) \tag{20}$$

P(n) and S(n) being the matrices of dimension pxn and (n−p)xn respectively which partition Q(n) in the form $$Q(n) = \begin{bmatrix} P(n) \\ \hline S(n) \end{bmatrix} \tag{21}$$

It follows that the weight vector $\underline{w}(n)$ must satisfy the equation $$R(n)\underline{w}(n) + \underline{U}(n) = 0 \tag{22}$$

and hence $$E(n) = \| \underline{V}(n) \| \tag{23}$$

Since R(n) is upper triangular, Equation (22) may be solved by a process of back-substitution. The resulting weight vector $\underline{w}(n)$ could be used to evaluate the iterative least squares residual defined in Equation (14).

The orthogonal triangularization process may be carried out using various techniques such as Gram-Schmidt orthogonalization, Householder transformation or Givens rotations. However, the Givens rotation method is particularly suitable for the iterative least squares problem. It leads to a very efficient algorithm whereby the triangularization process is recursively updated as each new row of data enters the computation.

A Givens rotation is an elementary unitary transformation of the form:

$$\begin{bmatrix} c & s \\ -s & c \end{bmatrix} \begin{bmatrix} 0 \ldots 0, r_i \ldots r_n \ldots \\ 0 \ldots 0, x_i \ldots x_n \ldots \end{bmatrix} = \begin{bmatrix} 0 \ldots 0, r_i' \ldots r_n' \\ 0 \ldots 0, 0 \ldots x_n' \end{bmatrix} \tag{24}$$

where $c^2+s^2=1$. The elements c and s may be regarded as the cosine and sine respectively of a rotation angle $\theta$ which is chosen to eliminate the leading element of the lower vector, ie such that:

$$-sr_i + cx_i = 0 \tag{25}$$

It follows that $c=r_i/r_i'$ and $s=x_i/r_i'$ where $r_i'=(r_i^2+x_i^2)^{\frac{1}{2}}$. A sequence of such elimination operations may be used to carry out an othogonal triangularization of the matrix B(n)X(n) in the following recursive manner. Assume that the matrix B(n−1)X(n−1) has already been reduced to triangular form by the unitary transformation:

$$Q(n-1)B(n-1)X(n-1) = \begin{bmatrix} R(n-1) \\ \hline 0 \end{bmatrix} \tag{26}$$

and define the unitary matrix $$\overline{Q}(n-1) = \begin{bmatrix} Q(n-1) & 0 \\ 0 & 1 \end{bmatrix} \tag{27}$$

then it follows that:

$$\overline{Q}(n-1)B(n)X(n) = \overline{Q}(n-1) \begin{bmatrix} \beta B(n-1)X(n-1) \\ \hline \underline{x}_n^T \end{bmatrix} = \begin{bmatrix} \beta R(n-1) \\ \hline 0 \\ \hline \underline{x}_n^T \end{bmatrix} \tag{28}$$

and so the triangularization process may be completed by the following sequence of operations: Rotate the p-element vector $\underline{x}_n^T$ with the first row of $\beta$R(n−1), so that the leading element of $\underline{x}_n^T$ is eliminated producing a reduced vector $\underline{x}_n^T$. The first row of $\beta$R(n−1) will be modified in the process. Then rotate the (p−1)-element reduced vector $\underline{x}_n^T$ with the second row of $\beta$R(n−1) so that the leading element of $\underline{x}_n^T$ is eliminated, and so on until every element of $\underline{x}_n^T$ has been eliminated. The resulting triangular matrix R(n) then corresponds to a complete triangularization of the matrix B(n)X(n) as defined in Equation (16). The matrix Q(n) is given by the recursive expression $$Q(n)=\hat{Q}(n)\bar{Q}(n-1) \qquad (29)$$

where $\hat{Q}$(n) is a unitary matrix representing the sequence of Givens rotation operations described above, $$\text{i.e. } \hat{Q}(n)\begin{bmatrix} \beta R(n-1) \\ \hline 0 \\ \hline \underline{x}_n^T \end{bmatrix} = \begin{bmatrix} R(n) \\ \hline 0 \end{bmatrix} \qquad (30)$$

From equations (18) and (29), it also follows that:

$$\begin{bmatrix} \underline{U}(n) \\ \hline \underline{V}(n) \end{bmatrix} = \hat{Q}(n)\bar{Q}(n-1)B(n)\underline{y}(n) = \hat{Q}(n)\bar{Q}(n-1)\begin{bmatrix} \beta B(n-1)\underline{y}(n-1) \\ \hline y_n \end{bmatrix} \qquad (31)$$

This yields the recursive expression:

$$\begin{bmatrix} \underline{U}(n) \\ \hline \underline{V}(n) \end{bmatrix} = \hat{Q}(n)\begin{bmatrix} \beta \underline{U}(n-1) \\ \hline \beta \underline{V}(n-1) \\ \hline y_n \end{bmatrix} \qquad (32)$$

Equation 32 demonstrates that the vector $\underline{U}$(n) can be updated using the same sequence of Givens rotations. The optimum least squares weight vector $\underline{w}$(n) may then be derived by solving Equation (22) by back-substitution. As has been said, Kung and Gentleman (ibid.) employ a triangular systolic array for matrix triangularization to obtain the R matrix, and a separate linear systolic array to perform the back-substitution.

However, for many purposes the weight vector $\underline{w}$(n) is not required explicitly. It is rather the least squares residual $e_n$ in Equation (14) which is of interest. Now $e_n$ is the nth element of:

$$B(n)\underline{e}(n)=B(n)X(n)\underline{w}(n)+B(n)\underline{y}(n) \qquad (33)$$

From Equation (16), it follows that $$B(n)X(n) = Q^T(n)\begin{bmatrix} R(n) \\ \hline 0 \end{bmatrix} = P^T(n)R(n) \qquad (34)$$

and hence $$B(n)\underline{e}(n)=P^T(n)R(n)\underline{w}(n)+B(n)\underline{y}(n) \qquad (35)$$

But the least squares weight vector $\underline{w}$(n) must satisfy Equation (22), so Equation (35) may be written in the form:

$$B(n)\underline{e}(n)=-P^T(n)\underline{U}(n)+B(n)\underline{y}(n) \qquad (36)$$

which does not depend explicitly on the weight vector $\underline{w}$(n). Furthermore, since $$Q(n)B(n)\underline{y}(n) = \begin{bmatrix} \underline{U}(n) \\ \hline \underline{V}(n) \end{bmatrix} \qquad (37)$$

it follows that $$B(n)\underline{y}(n) = Q^T(n)\begin{bmatrix} \underline{U}(n) \\ \hline \underline{V}(n) \end{bmatrix} = P^T(n)\underline{U}(n) + S^T(n)\underline{V}(n) \qquad (38)$$

and thus $$B(n)\underline{e}(n)=S^T(n)\underline{V}(n) \qquad (39)$$

From Equation (30) it follows that the recursive update matrix (n) must take the form:

$$Q(n) = \begin{bmatrix} A(n) & 0 & \underline{a}(n) \\ 0 & I & 0 \\ \underline{b}^T(n) & 0 & \gamma(n) \end{bmatrix} \qquad (40)$$

where A(n) is a pxp matrix, $\underline{a}$(n) and $\underline{b}$(n) are p-element vectors, I denotes the (n−p−1)×(n−p−1) unit matrix and $\gamma$(n) is a scalar. It then follows from Equation (32) that:

$$\underline{V}(n) = \begin{bmatrix} \beta \underline{V}(n-1) \\ \hline \alpha(n) \end{bmatrix} \qquad (41)$$

where $$\alpha(n) = \beta \underline{b}^T(n)\underline{U}(n-1) + \gamma(n)y_n \qquad (42)$$

Similarly, from Equations (21) and (29):

$$Q(n) = Q(n)\begin{bmatrix} P(n-1) & 0 \\ S(n-1) & 0 \\ 0 & 1 \end{bmatrix} = \begin{bmatrix} A(n)P(n-1) & \underline{a}(n) \\ S(n-1) & 0 \\ \underline{b}^T(n)P(n-1) & \gamma(n) \end{bmatrix} \qquad (43)$$

Hence $$S^T(n)\underline{V}(n) = \begin{bmatrix} S^T(n-1) & P^T(n-1)\underline{b}(n) \\ 0 & \gamma(n) \end{bmatrix}\begin{bmatrix} \beta \underline{V}(n-1) \\ \hline \alpha(n) \end{bmatrix} = \beta\begin{bmatrix} S^T(n-1)\underline{V}(n-1) \\ \hline 0 \end{bmatrix} + \alpha(n)\begin{bmatrix} P^T(n-1)\underline{b}(n) \\ \hline \gamma(n) \end{bmatrix} \qquad (44)$$

and so finally the expression:

$$e_n=\alpha(n)\gamma(n)=M_{out} \text{ in Equation (8)} \qquad (45)$$

But $\alpha$(n) is the result obtained when $y_n$ is rotated with each element in the vector $\beta\underline{U}$(n−1), and is obtained during the triangularization process as the output 31 of the final downstream internal cell $12_{45}$ (FIG. 4). Furthermore, it follows from Equation (42) that $\gamma$(n) is the result obtained by applying the same sequence of Givens rotations to rotate a unit input ($18_1$ in FIG. 1) with each element of the p-element null vector. Its value must therefore be given by the product $$\prod_{i=1}^{n} c_i(n),$$

where $c_i(n)$ is the cosine parameter associated with the ith Givens rotation in the sequence of operations represented by Q(n). This quantity may be computed during the triangularization procedure by connecting together the boundary cells 11 in FIG. 1 by connections 18, the product $$\prod_{i=1}^{n} c_i(n)$$

appearing at the output 30 (FIG. 4) of the final downstream boundary cell $\mathbf{11_{44}}$.

The foregoing analysis proves that the output of the multiplier or processing means 32 provides the least recursive squares residual $e_n$ without the need for back-substitution, which the prior art requires.

The recursive least squares minimization process described above may also be carried out using the square-root free Givens rotation approach. When matrix triangularization is carried out using this approach, the upper triangular matrix R is represented by a diagonal matrix D and a unit upper triangular matrix $\bar{R}$ such that $R = D^{\frac{1}{2}}\bar{R}$. The rotation operation then takes the form:

$$\begin{bmatrix} c & s \\ -s & c \end{bmatrix} \begin{bmatrix} 0\ 0\ \sqrt{d} & \ldots & \sqrt{d}\,\bar{r}_k & \ldots \\ 0\ 0\ \sqrt{\delta}\,x_i & & \sqrt{\delta}\,x_k & \ldots \end{bmatrix} = \begin{bmatrix} 0\ 0\ \sqrt{d'} & \ldots & \sqrt{d'}\,\bar{r}_k' & \ldots \\ 0\ 0\ 0 & \ldots & \sqrt{\delta'}\,x_k' & \ldots \end{bmatrix} \quad (50)$$

where $x_i$ and $x_k$ are respectively the inputs to boundary and internal cells, d and $\bar{r}_k$ are the values stored at boundary and internal cells, the presence or absence of a prime superscript to these quantities represents update or current values respectively, and $\delta$ and $\delta'$ are diagonal inputs to and outputs from boundary cells. By analogy with the previous analysis, the update formulae become:

$$d' = d + \delta x_i^2 \quad (50.1)$$

$$x_k' = x_k - x_i\bar{r}_k \quad (50.2)$$

$$\bar{r}_k' = \bar{c}\bar{r}_k + \bar{s}x_k \quad (50.3)$$

and $$\delta' = d\delta/d' = \bar{c}\delta \quad (50.4)$$

$\bar{c}$ and $\bar{s}$ being generalized rotation parameters (analogous to the basic Givens rotation parameter c and s) given by:

$$\bar{c} = d/d' \quad (50.5)$$

$$\bar{s} = \delta x_i/d' \quad (50.6)$$

It is important to appreciate that the basic and square-root free Givens rotation operations are mathematically equivalent despite the fact that they are expressed in terms of different parameters. It follows that the analysis in this section also applies to the square-root free Givens rotation case, and that an orthogonal triangularization of the matrix B(n)X(n) may be carried out using a sequence of square root free operations equivalent to the basic Givens rotation case. In the square root free case, the scaling factor $\delta$ associated with each data vector $\underline{x}_n^T$ is initialized to unity whilst the diagonal matrix $\bar{D}(n)$ is set equal to zero at the outset of the computation.

This latter analysis shows the multiplication by the processing means 32 also provides the recursive least squares residual in the square root free rotation case. The output 30 of boundary cell $\mathbf{11_{44}}$ provides a cumulative product of cosine-like terms which is equal to a factor multiplied by the product of Givens rotations cosine terms. The output 31 of internal cell $\mathbf{12_{45}}$ provides an output 31 equal to the cumulatively rotated $y_n$ divided by the same factor. On multiplying the outputs 30 and 31 at the processing means 32, the factor cancels out yielding the recursive least squares residual $e_n$ as before.

In general, for rotation algorithms not necessarily of the Givens or square root free varieties, it can be shown that the least squares residual $e_n$ can always be derived from the outputs 30 and 31 by an appropriately arranged processing means 32.

The systolic array of the invention may also be employed to solve least squares problems including constraints. The problem comprises determining a (p+1) vector of weights $\hat{w}$ for which $||\hat{\Phi}\hat{w}||$ is minimized, where $\hat{\Phi}$ is an nx(p+1) matrix with $p \leq n$, subject to the constant linear constraint $\hat{c}^T\hat{w} = \mu$, where $\hat{c}$ is the constraint vector and $\mu$ is a constant. It is assumed without loss of generality that $\hat{c}^T = [\underline{c}^T, 1]$, and so the constraint may be expressed alternatively in the form $\hat{w}_{p+1} = \mu - \underline{c}^T\underline{w}$, where $\underline{w}$ denotes the first p elements of $\hat{w}$. Denoting the first p columns of $\hat{\Phi}$ by $\Phi$ and the (p+1)th column by the vector $\rho$, the problem may be expressed as follows. Given an nxp matrix and a p-vector $\rho$, find the p-vector of weights $\underline{w}$ which minimizes the expression $||(\Phi - \rho c^T)\underline{w} + \mu\rho||$. This expression has the same form as Equation (1), with X replaced by $\Phi - \rho c^T$ and $\underline{y}$ replaced by $-\mu\rho$. Making appropriate substitutions in Equation (8), the systolic array of the invention will produce the least squares residual $\hat{\Phi}_n^T\hat{\underline{w}}_n$. The matrix $\Phi - \rho c^T$ may readily be evaluated by subtracting the vector $\rho_n\underline{c}^T$ or linear constraint factor from each row $\Phi_n$ of the submatrix $\Phi$ before it enters the systolic array 10. The unconstrained least squares problem to which Equations (1), (2) and (8) relate is in effect a special case of this constrained problem, the special case having the trivial constraint that $\hat{w}_{p+1}$ is equal to unity. It will be apparent that further linear constraints may be incorporated by additional subtraction operations on the matrix $\Phi$ before it enters the array. Such subtraction operations are electronically straight-forward to implement.

In processing a data system, it may be desirable to give more emphasis to recent data than to earlier data. In the least squares problem discussed with reference to Equation (8), the weight vector $\underline{w}(n)$ is computed as the best fit to all data received. Necessarily, as the number of data samples builds up, each successive sample has progressively less effect on w(n). To give more emphasis to more recent data, an exponentially decaying memory with a lifetime of approximately $(1-\beta)^{-1}$ samples may be implemented in the array of the invention, where $0<\beta\leq 1$, as set out in Equation (15) above. This is achieved by ensuring that on every array processing cycle the value of r (see FIG. 2) stored by each cell 11 or 12 in the Givens rotation case is multiplied by $\beta$ when updated, in addition to the updating requirements of Equations (4) to (7). In the square root free case, it is necessary to multiply by $\beta^2$ values stored on boundary cells 11 only, values stored in internal cells 12 being unaffected. An additional multiplication operation would accordingly be required in appropriate cells. Incorporation of a memory in this way allows the array of the invention to be used in a continuously adaptive mode.

The processing cells 11 and 12 of FIGS. 2 and 3 may be implemented electronically as a special purpose VLSI circuit comprising the required basic elements (eg a multiplier, square root generator, divider or reciprocal table, adder) together with memory and control units. Two types of circuits would then be required to construct the array of the invention.

Alternatively, the processing cells 11 and 12 may be implemented with appropriately programmed digital signal processing chips. Suitable types are presently commercially available in the form of special purpose microprocessors. The same basic component would then be used throughout the systolic array with the boundary and internal cells having different programs.

The systolic array of the invention may be employed for linear predictive filtering of images. The approach is to use a weighted average of an ensemble of data to predict other data. The residual or difference between the prediction and the received data to which it corresponds need only be recorded if significantly large. In this way only significant features of an image need be registered, resulting in a reduction in the data to be handled and the equipment required. One example of the use of this technique may be stated as follows. Given a two dimensional array of image pixel values, predict each element in a given row of the image using a weighted linear combination of the equivalent elements in the respective four previous rows. A vector of prediction coefficients is defined to minimize the sum squared residual for all data elements or pixel values in the same row up to and including the most recent pixel. In effect an ensemble average along the rows is used to carry out a linear prediction of future data to appear in later rows. An exponential memory may be incorporated as previously described so that the effective region of information averaging is localized, ie more reliance is placed on more recent data. The resulting residuals are employed to build up a filtered or reduced image with useful properties. Large residuals tend to indicate sudden or unpredictable changes within the image, and this type of information regarding discontinuities may be used as an aid to image analysis.

Figure 5:
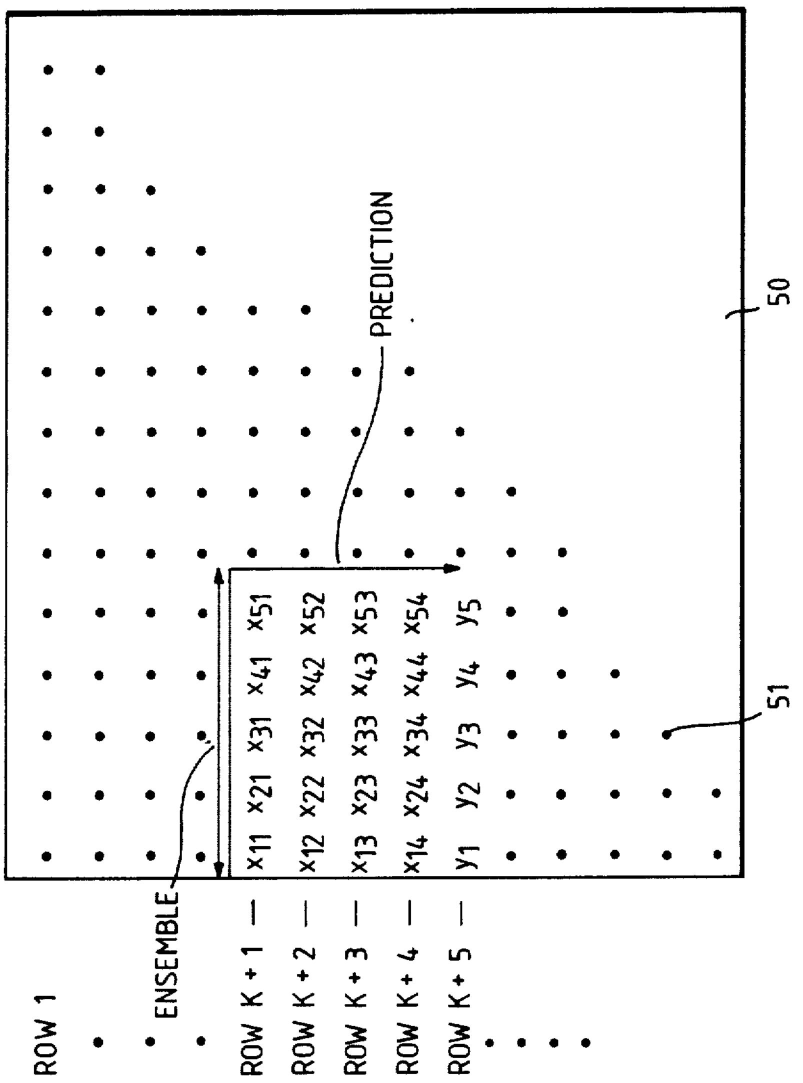
FIG. 5 is a schematic drawing of a two dimensional image for processing by the invention.

Referring to FIG. 5, an image represented by an array 50 of pixel dots 51 have rows and columns arranged horizontally and vertically. Each of the elements in the (k+5)th row of the image, designated as pixel values $y_i(i=1, 2 \ldots m)$, are predicted from the corresponding column elements in the four preceding rows (k+1) to (k+4) respectively. Elements in rows $k+j(j=1 \text{ to } 4)$ are designated $x_{1j}, x_{2j}, x_{3j}, \ldots x_{mj}$. The required residual for each element $y_i$ is the difference between it and the weighted x values in the same column of the preceding four rows, the weight vector being calculated to minimize the sum of the squares of the residuals associated with all elements up to $y_i$. This labelling and the residual correspond exactly to the way in which the matrix X and vector $\underline{y}$ are fed to the array 10 of FIG. 1 and to the Equation (8) expression for the residual, with rows of image elements $x_{ij}$ etc corresponding to columns of X. Accordingly, the array of the invention may be employed for linear predictive image filtering without back-substitution as would be required in the prior art.

The systolic array of the invention may also be employed to process the signals from a phased array radar operating as an adaptive digital beamformer. Radar signals may be adulterated by noise such as jamming sources. The phased array radar has primary and auxiliary antenna, and receives the desired signal in the main beam of its primary antenna. Unwanted signals appear in the sidelobes of the primary antenna. To eliminate the unwanted signals, the approach is to form a weighted linear combination of the auxiliary antenna signals in order to produce the best possible match to the noise waveform in the primary antenna channel. The combination may then be subtracted directly from the primary signal to achieve noise cancellation and improve signal to noise ratio. The vector of weights is complex, corresponding to amplitude and phase factors, and in effect generates an amplitude response function which has nulls in the direction of jamming sources.

Referring once more to FIG. 1, the vector $\underline{y}$ of elements $y_1$, $y_2$ etc would in this example represent the sequence of complex or phase and amplitude signal values from the primary antenna, which include contributions from the desired signal and from noise sources. Each column of numbers $x_{1i}, x_{2i}, \ldots x_{ni}$ (i=1 to p) represents the sequence of complex signal values from the ith of p auxiliary antenna elements. It is commonly assumed in sidelobe cancellation that the auxiliary antenna elements sample the noise field alone and do not receive the desired signal. The complex signal values are derived from the main and auxiliary antennas by separating the analog signal at intermediate frequency (IF) into its in-phase and quadrature or I and Q channels and passing each channel through an A/D converter.

Assuming that the desired signal is uncorrelated with the various noise signals, noise cancellation from the primary antenna signals is achieved by choosing the vector of complex weights $\underline{w}(i)$ at the ith sample time such that $||X(i)\underline{w}(i)-\underline{y}(i)||$ is minimized. X(i) denotes the ixp matrix of all signal values obtained up to the ith sample time from the p auxiliary antennas, and $\underline{y}(i)$ denotes the corresponding vector of values from the primary antenna of which the ith value is y(i). The noise cancelled output at time i is then $\underline{x}_i^T\underline{w}(i)-y_i$. This is the residual generated by the systolic array of the invention as demonstrated by Equation (8). The invention is accordingly capable of providing a noise-cancelled output for an antenna array, cell functions being employed which are appropriate for complex amplitude and phase data.

The radar signal processing application of the invention may be made continuously adaptive by incorporating an exponential memory with lifetime $\sim(1-\beta)^{-1}$ as previously described. Furthermore, noise-cancellation may be carried out with a general antenna array of (p+1) elements subject to the constraint that the antenna array response in a specific observation direction is constant. This is achieved by incorporating a constant linear constraint of the form $\underline{c}^T\underline{w}(i)=\mu$ as previously described.

I claim:

1. In a systolic array arranged for matrix triangularization of an input stream of data elements, the array including:

(1) rows of cells each beginning with a boundary cell and continuing with at least one internal cell, the array rows being also arranged to form columns comprising a first column containing a boundary cell only, a final column containing internal cells only and intervening columns terminating at a boundary cell arranged below at least one internal cell with the number of internal cells increasing from one by one per column to a penultimate column containing one internal cell less than those contained by the final column;

(2) processing means in the boundary and internal cells to cause the boundary cells to evaluate S and C rotation parameters from data input thereto, and to cause the internal cells to apply evaluated S and C parameters to data input thereto, the S and C parameters being any one of Givens sine and cosine rotation parameters and non-Givens rotation parameters performing a function related to rotation;

(3) nearest neighbor cell interconnection lines arranged to provide for (a) evaluated S and C parameters to pass along rows for application to input data by successive internal cells to produce rotated data, and for (b) rotated data to pass down columns to provide input to adjacent cells; and (4) first row cell inputs arranged to receive the said input stream such that each first row cell receives successive respective data elements;

the improvement comprising the array including processing means arranged to multiply successive cumulatively rotated data elements output from the final column's lowermost cell by respective relatively delayed and cumulatively multiplied C parameters output from all boundary cells to generate recursively quantities at least closely related to least square residuals.

2. A systolic array according to claim 1, further including means for emphasising more recent data in the input stream.

3. A systolic array according to claim 2 wherein each boundary cell and each internal cell includes means for multiplying a stored signal by a constant having a value between zero and unity.

4. A systolic array according to claim 2 wherein each boundary cell includes means for multiplying a stored signal by a constant having a value between zero and unity.

5. A systolic array according to claim 1, further including means for substracting a linear constraint factor from the input of said data stream prior to array entry.

6. A systolic array according to claim 1 further including means for inputting image data to the array for linear predictive filtering.

7. A systolic array according to claim 1 further including means for connecting the array to a phased array of radar antennas.

8. In a systolic array arranged for matrix triangularization of an input stream of data elements, the array including:

(1) rows of cells each beginning with a boundary cell and continuing with at least one internal cell, the array rows being also arranged to form columns comprising a first column containing a boundary cell only, a final column containing internal cells only and intervening columns terminating at a boundary cell arranged below at least one internal cell with the number of internal cells increasing from one by one per column to a penultimate column containing one internal cell less than those contained by the final column;

(2) processing means in the boundary and internal cells to cause the boundary cells to evaluate S and C rotation parameters from data input thereto, and to cause the internal cells to apply evaluated S and C parameters to data input thereto, the S and C parameters being any one of Givens sine and cosine rotation parameters and non-Givens rotation parameters performing a function related to rotation;

(3) nearest neighbor cell interconnection lines arranged to provide for (a) evaluated S and C parameters to pass along rows for application to input data by successive internal cells to produce rotated data, and for (b) rotated data to pass down columns to provide input to adjacent cells; and (4) first row cell inputs arranged to receive the said input stream such that each first row cell receives successive respective data elements;

the improvement comprising the boundary cells in at least the second to final row having processing means for multiplying C parameter inputs by evaluated C parameters to provide C parameter outputs, each boundary cell other than that in the final row having a C parameter output connected via delaying means to a C parameter input of a respective boundary cell in a preceding row, and the final row boundary and internal cells having respectively a C parameter output and a rotated data output connected to a multiplying means arranged to multiply them together to provide successive products of cumulatively rotated data with cumulatively rotated data and generate recursively quantities at least closely related to least squares residuals.

9. A systolic array according to claim 8 further including means for emphasizing more recent data in the input stream.

10. A systolic array according to claim 9 wherein each boundary cell and each internal cell includes means for multiplying a stored signal by a constant having a value between 0 and unity.

11. A systolic array according to claim 9 wherein each boundary cell includes means for multiplying a stored signal by a constant having a value between 0 and unity.

12. A systolic array according to claim 8 further including means for subtracting a linear constraint factor from the data of said input stream prior to array entry.

13. A systolic array according to claim 8 further including means for inputting image data to the array for linear predictive filtering.

14. A systolic array according to claim 8 further including means for connecting the array to a phase array of radar antennas.

* * * * *

UNITED STATES PATENT AND TRADEMARK OFFICE
CERTIFICATE OF CORRECTION

PATENT NO. : 4,727,503

DATED : February 23, 1988

INVENTOR(S) : McWHIRTER, John Graham

It is certified that error appears in the above-identified patent and that said Letters Patent is hereby corrected as shown below:

IN THE CLAIMS:

Claim 8, line 38, delete "pre-"

line 39, delete "ceding" and before "row";

insert --succeeding--;

line 43, delete "cumulatively rotated data" and insert --relatively delay and cumulatively multiplied C parameters--.

Signed and Sealed this

Thirteenth Day of September, 1988

*Attest:*

DONALD J. QUIGG

*Attesting Officer*

*Commissioner of Patents and Trademarks*